J. W. & C. W. HAYS.
TEMPERATURE CONTROLLING APPARATUS.
APPLICATION FILED SEPT. 14, 1914.
1,157,866.
Patented Oct. 26, 1915.
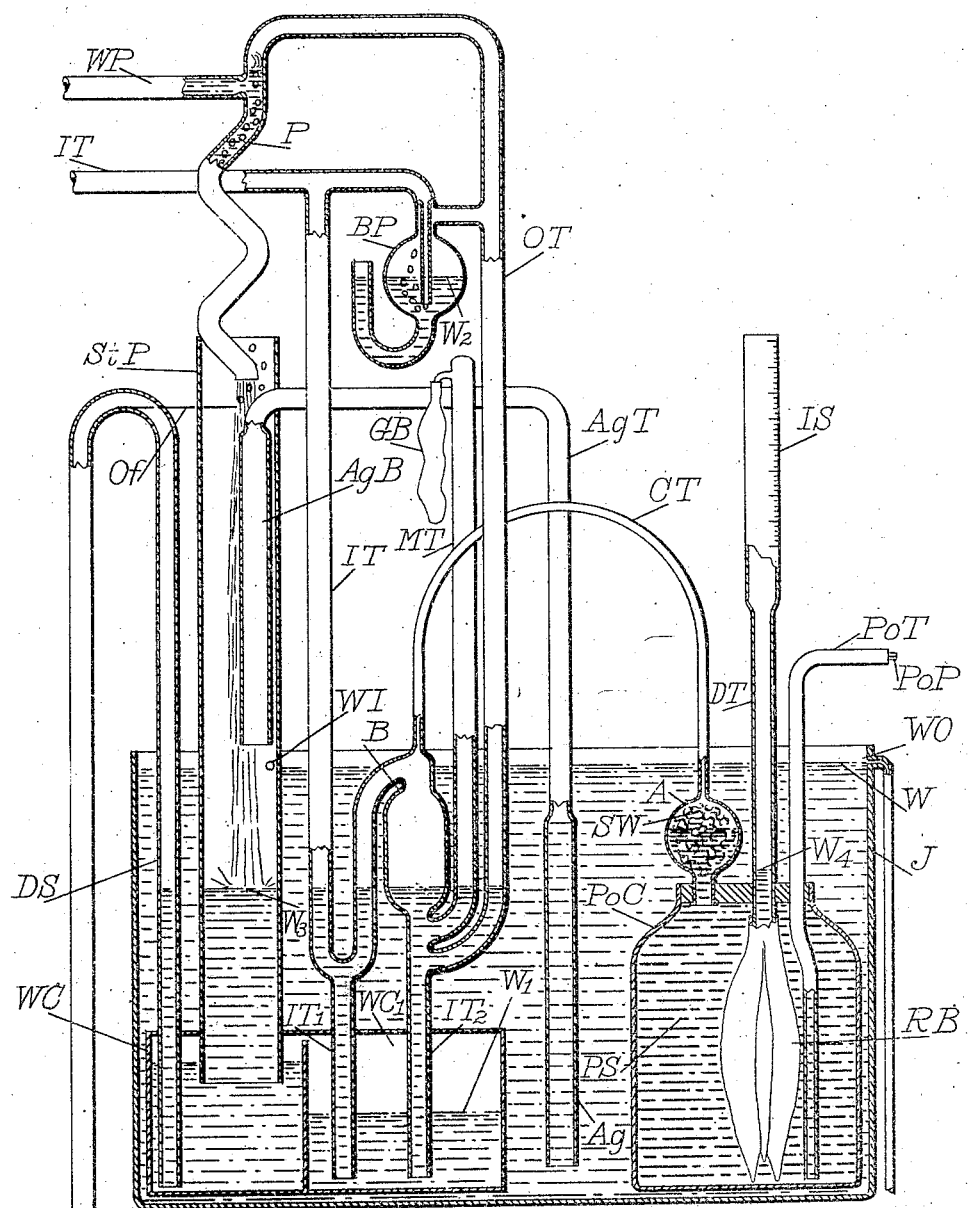
WITNESSES:
INVENTORS.

UNITED STATES PATENT OFFICE.

JOSEPH W. HAYS AND CHARLES W. HAYS, OF CHICAGO, ILLINOIS.

TEMPERATURE-CONTROLLING APPARATUS.

1,157,866.  Specification of Letters Patent.  Patented Oct. 26, 1915.

Application filed September 14, 1914. Serial No. 861,737.

*To all whom it may concern:*

Be it known that we, JOSEPH W. HAYS and CHARLES W. HAYS, citizens of the United States, and residing in the city of Chicago, county of Cook, and State of Illinois, have invented certain new and useful Improvements in Temperature-Controlling Apparatus, of which the following is a specification.

Our invention relates especially to automatic gas analyzers and is designed to keep the gas at stable temperature during the process of analysis. In nearly all forms of gas analyzing apparatus depending upon the absorption principle the percentage of the gas constituent sought is determined volumetrically, the gas volume taken for analysis being compared with the gas volume after absorption. As gas volumes are affected by temperature it is absolutely essential that the measurement following absorption be made at the temperature obtaining during the primary measurement. In hand manipulated gas analyzers this is readily accomplished by a simple water-jacketing of the burette in which the gas is primarily measured. Following absorption the gas is returned to the burette for the final measurement. Both measurements accordingly take place in the same tube or chamber surrounded by the same jacketing water. While this method is sufficiently reliable to satisfy the requirements of industrial gas analysis it does not meet the demands of exact gas analysis for the following reason: The chemical reaction of which gas absorption is an incident is accompanied by heat. Accordingly, the gas when returned to the burette for measurement following absorption is at a higher temperature than obtained during its primary measurement. This results in raising the temperature of the jacketing water, the result being that the second measurement is made at an appreciably higher temperature than the first measurement.

While the method of temperature control herein disclosed and claimed by applicants is especially adapted to automatic gas analyzers, and is shown as so applying in our drawings, we believe that it might have a practical application to hand-manipulated analyzers and perhaps a wide use in the arts. So far as the investigations of applicants have gone no attempt has ever been previously made to apply temperature control to an automatic gas analyzer.

We attain the objects of our invention by the means illustrated in the accompanying drawing, in which for the sake of clearness we have shown only those parts of our automatic gas analyzer that relate to the present invention. The fluid leveling device specifically claimed in our co-pending application, Serial Number 779,547, is not included in the drawing.

"J" is a jacketing vessel, preferably of glass.

"B" is the burette or measuring chamber and "A" the absorption chamber, packed with a fibrous material, "SW." These are connected by the capillary tube "CT". "A" is connected with the closed potash chamber "PoC" in which we have the rubber bag, "RB.", submerged in the caustic potash solution, "PS". "J" is completely filled with water, "W". "IT" and "OT" are gas inlet and outlet tubes leading to and from "B" respectively.

"P" is a gas pump, operated by a stream of water delivered through the pipe, "WP". The water is delivered from "P" into the stand-pipe "StP." The stand-pipe is soldered into the water chamber "WC" and extends down a short distance into same.

"DS" is a discharge siphon which empties the standpipe and the water chamber when the water, "W³." has accumulated in the stand-pipe to the overflow point, "OF".

The tubes "IT¹" and "IT²", connect with the pipes "IT" and "OT" as shown and are soldered into the top of "WC".

"BP" is a by-pass valve filled with water "W²", connecting the tubes "IT" and "OT."

"Ag" is an agitator for stirring the water in the jacketing tank, "J". "Ag" is open at the bottom and communicates by the tube "AgT", with the agitator bell, "AgB" located in the stand-pipe. A water inlet, "WI" may be provided in the stand-pipe if desired and a water outlet from the jacketing tank at "WO" or any other convenient point.

The measurement of the gas sample at atmospheric pressure is accomplished by means of the tube "MT" and the gas bag "GB" as hereinafter described. The apparatus is charged with the caustic potash solution, or other liquid chemical used, through the tube "PoT," which is closed by the plug "PoP." The displacement tube, "DT" is connected with the rubber bag. "RB." The latter is filled with water "W⁴" which extends into and partly fills "DT." The percentage of the gas being determined is indicated upon the scale "IS" by the water displaced upward into "DT" from "RB."

The apparatus operates as follows: The gas pump, or aspirator, "P," which is operated by a small stream of water delivered through "WP," creates a partial vacuum in the pipe "OT." This is communicated to "B" and the pipe "IT,"—the latter being connected with the source of gas supply. As a result of the lowered pressure gas flows through "IT," "B" and "OT" to the pump where it mingles with the water. The water is discharged into "S$t$P" and accumulates in "WC." The water in a few moments reaches and seals the lower end of "S$t$P." A quantity of air is trapped in "WC." This air is compressed by the static action of the water accumulating in "S$t$P." As a result of this pressure, water "W¹" is displaced from the secondary chamber "WC¹" through the tubes, "IT¹" and "IT²" into the tubes, "IT," "OT" and "MT" and the burette "B." When the water reaches and seals the lower ends of the tubes "IT" and "OT" the flow of gas through "B" is shut off, a quantity of gas is trapped in "B" and "MT" and the flow of gas is short-circuited through the liquid valve "BP." As the water rises toward the burette "B," some of the trapped gas is displaced into "MT" and the distensible gas bag, "GB." When "MT" is sealed by the water the exact quantity of gas required is trapped off in "B" and in the tube connecting the upper part of "B" with "IT." This exact quantity of gas is measured at the pressure of the atmosphere and at the temperature of the water surrounding "B." The water continues to rise and pushes the gas through the capillary tube, "CT" into "A," displacing the liquid chemical from "A" into "PoC." This displacement results in a compression of the rubber bag, "RB" and a displacement of some of the water "W⁴" therefrom into "DT." "A" is packed with a fibrous material, preferably steel wool, to expedite absorption. It is plain to be seen that the height to which the water rises along the scale, "IS" is inversely proportional to the volume of gas absorbed in "A."

It is of the utmost importance that the gas while in "A" shall be held under the same temperature at which it was measured in "B." If the slightest change in temperature takes place after the gas is measured the volume of the gas remaining in "A," following the absorption, will be affected and the indication of the per cent. of absorption will be incorrect upon the scale, "IS." Outside agencies may affect the temperature of the gas following its measurement in the burette and the heat produced by the chemical reaction attending the absorption is sure to affect the volume of the gas. This heat of reaction must be dissipated as fast as produced. The absorption chamber, "A" is submerged in the same body of water that surrounds "B." And the quantity of water employed is relatively large which insures that the heat taken up by the water following the reaction of absorption in "A" will not be sufficient to raise the temperature of the whole body of the water to an appreciable extent.

It is essential that the water in the jacketing chamber "J" should be of uniform temperature throughout its entire mass. The water in "J" may be subjected to wide changes of temperature in the course of the day, especially if the apparatus is situated where it will be subjected to considerable heat or to the influence of drafts, as for example in a boiler room. Any influences tending to raise or lower the temperature of the water in "J" will cause a stratification of the water,—the warmer water rising to the top of the chamber and the colder water sinking to the bottom. To prevent such stratification, we have provided as follows: The agitator tube "A$g$" is open at the lower end and extends to near the bottom of the chamber "J". It is connected by the tube, "A$g$T" with the bell, "A$g$B", located near the top of the stand-pipe. Water normally stands in "A$g$" at substantially the same level as the surrounding water in "J". When the rising water in the stand-pipe reaches and seals the lower and open end of "A$g$B" and rises around same, air is forced from "A$g$B" through "A$g$T" into "A$g$", forcing the water down out of same into the bottom of "J". When the water reaches the point, "OF" in "S$t$P", the siphon, "DS", is started and quickly empties the stand-pipe and the chamber "WC". Following this, water rises from the bottom of "J" into "A$g$", the gas remaining in "A" is returned to "B" and gas flow is again instituted through "IT", "B" and "OT". The cycle of operation above described repeats itself periodically,—the duration of the cycle being fixed by the rate at which water is delivered to "S$t$P" from "P". The stirring effect of "AG", maintains uniform temperature throughout the water in "J".

As another means of insuring uniform temperature of the water in "J", we have employed the expedient of flowing water through "J" while the apparatus is in operation. To effect this, a small opening, "WI", may be provided in the stand-pipe. When the level of the water in "S$t$P" is above this opening, water will flow through into "J". It is necessary to provide an overflow outlet, "WO" The inflow and outflow of a very small quantity of water, will, in ordinary cases, insure uniformity of temperature throughout the mass of water in "J".

This application is a division of our copending application, Serial No. 779,547, filed July 17, 1913.

We claim:

1. A gas analyzer consisting of tube-connected gas measuring and absorber vessels, means for forcing the gas to be analyzed from the measuring to the absorber vessel and means for maintaining the gas at constant temperature during the measuring and absorbing operations.

2. A gas analyzer consisting of tube connected gas measuring and absorber vessels, means for maintaining both of said vessels at common temperature and for transferring gas from one of said vessels to the other.

3. A gas analyzer consisting of connected gas measuring and gas absorber vessels, means for transferring gas from the one vessel to the other and means for preventing outside agencies from causing change of volume of the gas when in said vessels.

4. A gas analyzer consisting of tube connected gas measuring and absorber vessels, means for maintaining both of said vessels at common temperature and means for passing gas back and forth between said vessels.

5. A gas analyzer consisting of gas measuring and absorber vessels and a common jacketing medium completely surrounding said vessels.

6. A gas analyzer consisting of connected gas measuring and absorber vessels, a common jacketing medium completely inclosing said vessels and means for causing gas to flow normally through said measuring vessel and periodically from said measuring vessel to said absorber vessel.

7. A gas analyzer consisting of connected gas measuring and gas absorber vessels, a jacket surrounding said vessels, an inlet and an outlet to said jacket and means for causing a jacketing fluid to flow through said jacket from said inlet to said outlet.

8. The combination with a gas analyzer of a temperature controlling means whereby the temperature of the gas sample is rendered constant during the processes of measurement and absorption.

In witness whereof, we have hereunto set our hands and seals this 17th. day of August, 1914.

JOSEPH W. HAYS. [L. S.]
CHARLES W. HAYS. [L. S.]

Witnesses:
HARVEY G. HAYS,
FLORENCE M. NORMAN.